(12) United States Patent
Morrison, Jr., deceased et al.

(10) Patent No.: US 6,450,871 B1
(45) Date of Patent: Sep. 17, 2002

(54) MULTI-PURPOSE KNIFE WITH VEIN-REMOVAL BRUSH

(76) Inventors: George E. Morrison, Jr., deceased, late of Greenville, GA (US); by Jane Morrison, executor, 561 S. Talbotton St., Greenville, GA (US) 30222

( * ) Notice: Subject to any disclaimer, the term of this patent is extended or adjusted under 35 U.S.C. 154(b) by 0 days.

(21) Appl. No.: 09/672,124

(22) Filed: Sep. 27, 2000

Related U.S. Application Data

(60) Provisional application No. 60/157,030, filed on Oct. 1, 1999.

(51) Int. Cl.$^7$ ................................................ A22C 9/22
(52) U.S. Cl. .................... 452/6; 452/1; 452/3
(58) Field of Search .................. 452/3, 2, 1, 6

(56) References Cited

U.S. PATENT DOCUMENTS

| | | | |
|---|---|---|---|
| 2,561,359 A | * | 7/1951 | Gorton .......................... 452/3 |
| 2,857,620 A | * | 10/1958 | Joseph .......................... 452/3 |
| 3,178,765 A | | 4/1965 | Gorton, Jr. |
| 3,271,814 A | | 9/1966 | Gorton, Jr. |
| 3,353,207 A | | 11/1967 | Weinberger |
| 3,952,371 A | * | 4/1976 | LaPine et al. .................. 452/3 |
| 4,439,893 A | * | 4/1984 | Betts ............................. 17/72 |
| 4,553,287 A | | 11/1985 | DeSordi et al. |
| 4,759,126 A | | 7/1988 | McCoy et al. ............. 30/120.1 |
| 4,967,446 A | | 11/1990 | Padel ............................ 452/3 |

* cited by examiner

*Primary Examiner*—Peter M. Poon
*Assistant Examiner*—Floris C Copier
(74) *Attorney, Agent, or Firm*—Kilpatrick Stockton LLP

(57) ABSTRACT

A cutting implement particularly useful for manually deveining shrimp or other crustaceans includes a blade with a cutting edge, a handle attached to the cutting implement, and a vein-removal brush mounted on the cutting implement. The user exposes the intestinal cavity of the crustacean with the cutting edge, and then laterally rotates the cutting implement such that the vein-removal brush is adjacent to the cavity. The user then sweeps the intestinal cavity with the vein removal brush such that the crustacean is cleaned of intestinal debris.

2 Claims, 1 Drawing Sheet

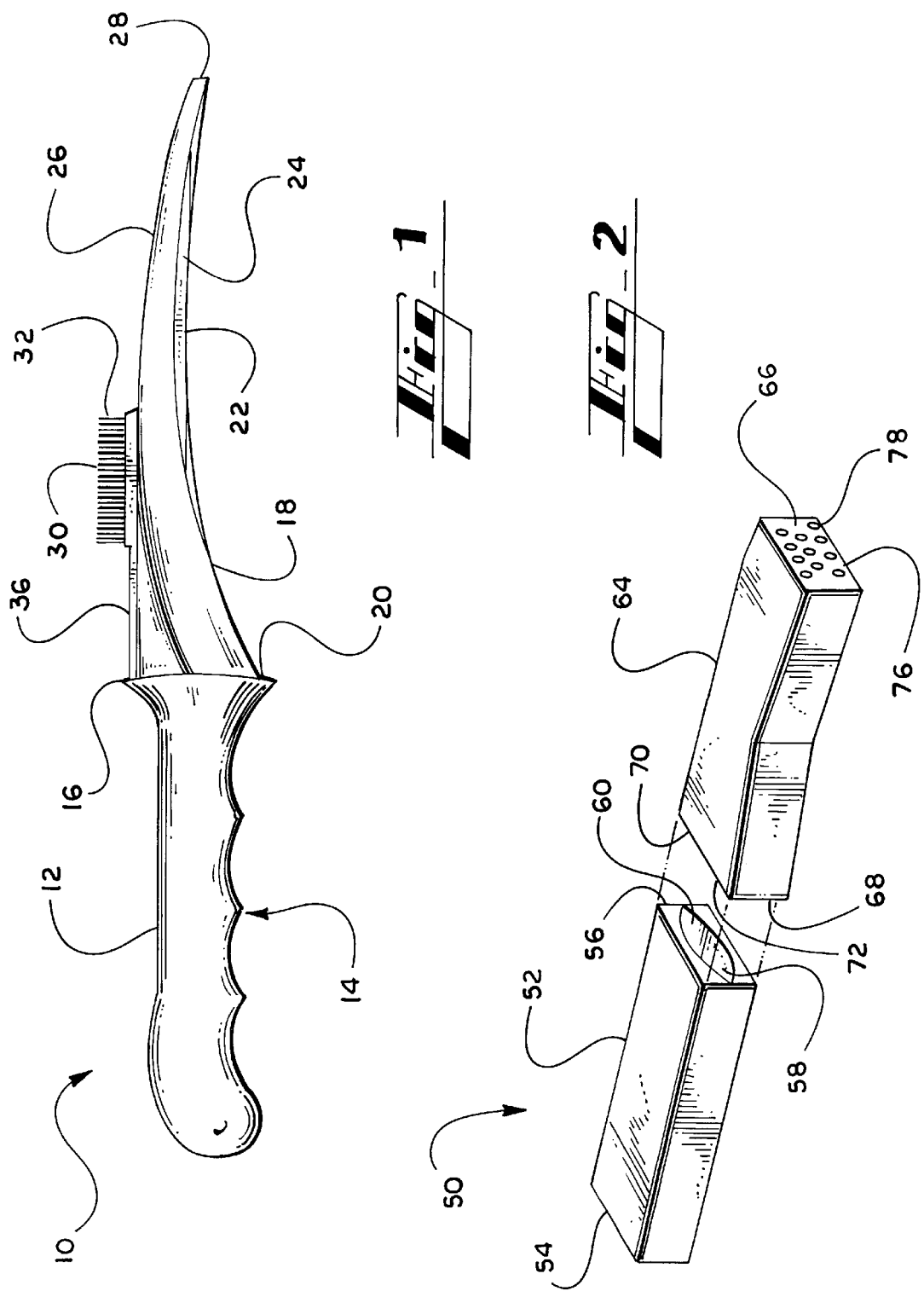

MULTI-PURPOSE KNIFE WITH VEIN-REMOVAL BRUSH

RELATED APPLICATION

This U.S. patent application relates to and claims priority from U.S. Provisional Patent Application Ser. No. 60/157,030 entitled "Shrimp Kleen," filed Oct. 1, 1999.

TECHNICAL FIELD

This invention relates generally to knives, and in particular, a manual tool for shelling, cutting, and cleaning crustaceans.

BACKGROUND OF THE INVENTION

In the preparation of shrimp or similar crustaceans for cooking and eating, it is often desirable to remove the head, shell and other outer appendages, and to remove the intestines. Because this process can be time-consuming and labor intensive, many attempts have been made to develop tools which effectively prepare the crustacean, with minimal effort and expenditure of time, while optimizing the appearance, consistency, and flavor of the crustacean.

Some tools focus on shelling, "butterflying", and removing the intestine in a single hand-guided motion. U.S. Pat. No. 4,759,126 (McCoy) discloses a knife, which comprises a curved blade with angled teeth adjacent to the handle of the knife. When inserted into the cavity of a de-headed crustacean, a thrusting motion removes the shell, slits the crustacean in a "butterfly" fashion and removes the vein.

Similarly, U.S. Pat. No. 3,353,207 (Weinberger) discloses a knife having a handle and a blade. The cutter portions consist of an obtuse angle positioned at the end of the blade, below which are teeth that simultaneously remove the intestines while the cutter portions slit the shell.

U.S. Pat. No. 4,553,287 (DeSordi) discloses a device which includes an elongated body having a tapered portion at one end, a de-heading portion at another end, and a handle adjacent to the de-heading portion. The tapered portion is adapted for lengthwise insertion into the body of the crustacean, thereby rupturing its shell. The device also includes an elongated ridge which deveins the crustacean as the device is inserted. This device ruptures the body of the shrimp.

U.S. Pat. Nos. 3,178,765 (Gorton) and 3,271,814 (Gorton), also disclose an elongated tapered tool which attempts to simultaneously shell and devein the crustacean. The tool incorporates teeth, which may be positioned along its entire length or a portion thereof, and which may vary in size and alignment.

Other tools attempt to remove the intestines from the crustacean without cutting or otherwise opening it lengthwise. U.S. Pat. No. 4,967,446 (Padel) discloses a method of and device for tweezing the intestines out through a small opening made with a piercing member.

A problem common to the above devices is that they often cause the intestine to rupture, break, or disintegrate during the removal process. As with most biological matter, the consistency of the intestine may vary, and coupled with variances in the amount of pressure or force used by the human operator, these devices rarely remove the intestine. This leaves the operator with the task of removing the debris that is then loose in the cavity of the crustacean. As the intestines contain waste products which may pose a health hazard and which often cause a gritty sensation when eaten, it is critical to remove this debris. None of these devices provides an effective means of removing loose debris from the intestinal cavity.

It is well known in the art that a knife may be used to remove a crustacean's head and shell, and to expose the intestines, which can then be scraped out. However, if the knife is used for scraping the cavity, the operator again runs the risk of rupturing the intestines and releasing the contents. Further, using a knife to cut and then another implement to remove the intestines requires the operator to alternate between two implements repeatedly, thereby significantly decreasing efficiency, and increasing the amount of exertion required.

Another problem common to the devices in the prior art is the lack of a safe means of storing the device while it is not in use. If stored in an ordinary tableware drawer or container, the prior art devices have teeth or other appendages can be easily be damaged by other implements stored in the same manner, and can be hazardous to any person reaching into the drawer or container.

Thus, there is a need in the art for one implement that is equipped to complete both tasks quickly and easily, and which minimizes the risk of rupturing the intestines. There is also a need in the art for a device that includes an integrated safe storage means that protects both the device, and the hands of a potential operator.

SUMMARY OF THE INVENTION

The present invention provides a means for cutting, removing the shell, and deveining crustaceans, while minimizing the risk that the intestines will be ruptured, and providing an effective and efficient means of removing intestinal debris from the intestinal cavity. In accordance with the present invention, these objectives are accomplished by providing a device for cutting the shell and flesh of the crustacean, comprising: a cutting implement which includes a blade with a cutting edge; a handle attached to the cutting implement; and a vein-removal brush mounted on the cutting implement. The present invention also seeks to provide a carrying case, which enables the device to be safely stored with other culinary implements.

In a preferred embodiment, a blade is fixed to an easy-to-grip handle, and is configured so that it easily cuts through the shell of a crustacean, enabling the operator to remove the head and shell, and to cut through the flesh of the crustacean thereby exposing the intestinal "vein". Using the brush fixed opposite the cutting side of the blade, the operator can then remove the intestines and any debris present in the cavity of the crustacean. This cutting implement can be used as a kitchen implement for preparing raw food, and as tableware for preparing cooked food for eating.

When the implement is not in use, it can be stored in its case. The case includes a ventilating means that allows the brush to dry, while preventing injury to potential operators and protecting the implement from damage.

Alternative embodiments incorporating the present invention are readily apparent. For example, the entire implement can be manufactured in a variety of sizes. The implement could be manufactured with a removable and reversible blade, allowing the operator to detach the blade from the handle, turn it around, and reinsert it into the handle. Vent holes can be positioned on any surface or surfaces of the carrying case, which may be open on either or both ends. The case can be comprised of an interlocking cap and a base, or of one section that protects the entire implement and attaches itself directly with the implement. The vein-removal brush can be attached to the implement, or integral to the handle or the blade.

BRIEF DESCRIPTION OF THE DRAWINGS

FIG. 1 is a side view of a preferred embodiment of the present invention.

FIG. 2 is a perspective view of a preferred embodiment of a case for the present invention.

DETAILED DESCRIPTION OF THE INVENTION

Referring now in more detail to the drawings, in which like numerals refer to like parts throughout the several views, FIG. 1 shows a preferred embodiment of the cutting implement 10 embodying the present invention. Generally speaking, the person operating this invention achieves a firm grasp of the handle 12 of the implement 10 by means of grips 14, which are molded to conform to a typical operator's hand. The operator then holds the raw or cooked crustacean in the opposite hand. Using the implement's cutting edge 22, possibly including its sharpened surface 24 and the tip 28 of the blade 18, the operator can effectively cut and/or remove the outer shell and appendages and slice the crustacean in such a manner as to expose its intestines. Without having to release the implement 10 or switch hands, the operator can then turn the implement 10 in his or her hand, while maintaining a hold on the crustacean. Using the brush 30 mounted on the non-cutting edge 26 of the blade, the intestines can be scraped out of the intestinal cavity, preferably intact. If the intestines rupture or other debris is found in the cavity, the operator can repeatedly sweep the cavity with the brush 30 until all debris is removed. Alternatively, the operator can use any part of the blade 18 to remove the intestines, with the brush 30 being reserved to clean any remaining debris from the cavity. Because the cutting implement 10 can be used to clean raw or cooked food, it can be used as both a kitchen implement and as tableware.

When the implement 10 is not in use, it can be stored in its case 50 as shown in FIG. 2. The case 50 allows the brush 30 to dry while preventing injury to potential operators and protecting the blade 18 and brush 30 from damage. This effect is achieved by means of a cap 64, which covers the blade 18, the end 66 of such cap 64 having a plurality of vent holes 74. Having been placed over the blade 18, the cap snaps onto the base 52 of the case 50, the base 52 having been placed over the handle 12.

The cutting implement 10 shown in FIG. 1 will now be described in detail. The cutting implement 10 comprises a handle 12 with grips 14 which facilitate a firm grasp by the operator's hand. At the handle base 16, the blade 18 is affixed at its base 20. In the illustrated embodiment, a blade 18 is configured so that its base 20 can be fixed onto a handle 12, and a handle 12 is configured so as to receive and securely hold the blade 18 in place. The blade 18 is generally flat, and tapers to a relatively narrow tip 28. The cutting edge 22 of the blade 18 may be curved so as to approximate the natural body curvature of crustaceans such as shrimp, prawns, or crawfish, and comprises a sharpened edge 24. The non-cutting edge 26 of the blade 18 opposite the cutting edge 22 may be curved to a lesser degree, and has sufficient area upon which to affix a vein-removal brush 30 for cleaning the intestinal cavity of a crustacean. The vein-removal brush 30 comprises at least one row of tines or bristles 32, which are held in place by a brush base 34 which may extend integrally into a brush handle 36. The brush handle 36 is affixed to both the base 16 of the handle 12 and along a portion of the non-cutting edge 26 of the blade 18.

The case 50 for storing or carrying the implement 10 is shown in FIG. 2, generally comprising a base section 52 and a cap section 64. In the embodiment shown, the base 52 is closed at one end 54. The opposite end 56 of the base 52 has an orifice 58 for receiving the implement handle 12. The interior surface 60 of the orifice 58 may be smooth to aid in sliding the handle 12 into the base, or may be lined with a rubbery material, possibly with a non-slip coating. The open end 56 of the base is equipped with a means, such as a friction-fit ridge, for interlocking and securing with the open end 68 of the cap 64. The cap 64 is vented at one end 66. The opposite end 68 of the cap has an orifice 70 for receiving the implement blade 18. The interior surface 72 of the orifice 70 may be smooth to aid in sliding the blade 18 into the cap, and may be lined with a rubbery material, possibly with a non-slip coating. The open end 68 of the cap 64 is equipped with a means for interlocking with the open end, as described above. The vented end 66 of the cap 64 is constructed with a plurality of vent holes 76, which facilitate the exposure of the brush 30 to outside air, thereby allowing the brush 30 to dry. An individual vent hole 78 may be of any shape that will permit air to enter the case 50.

In an alternative embodiment, the vent holes 76 may be positioned at intervals on any surface or surfaces of the cap 64. In another embodiment, the base 52 of the case 50 can be either entirely open or vented at its end 54.

In another embodiment, the case 50 is comprised of one section, instead of having a base 52 section and a cap 64 section. The case 50 could interlock directly with the handle 12, or otherwise fit securely over the implement 10.

In other embodiments, the implement 10 can be manufactured in a variety of sizes. The blade 18 can be removable and/or reversible.

In another embodiment, the brush 30 can be mounted on the handle 12 of the implement 10, or integrated therewith.

In yet another embodiment, the case 50 could be constructed so as to also store a safety glove, which would protect the hands of an operator from accidental cuts.

Thus, the invention provides an implement which streamlines the process of preparing raw or cooked shellfish, by minimizing the number of tools needed to effectively complete the task, reducing the risk to the operator of injury, and reducing the risk of damage to the implement during storage.

Those skilled in the art will understand that the methods and devices described herein are not related or limited to any particular material or method of construction. Rather, various materials may be used to construct the implement, and it can be used to clean various types of crustaceans and other food. For example, the blade may be constructed of metal or any other material sufficiently hard to cut through a crustacean's shell. The vein-removal brush may be constructed of plastic, or of the same material as the handle of the cutting implement. The handle of the cutting implement may be constructed of rubber, plastic, metal, or a combination thereof.

While the present invention in its various aspects has been described in detail with regard to preferred embodiments thereof, and an example of alternative embodiments have been provided, it should be understood that variations, modifications and enhancements can be made to the disclosed apparatus and procedures without departing from the scope of the present invention as defined in the appended claims.

What is claimed is:

1. A combination cutting and cleansing implement, comprising:

an elongated knife blade of generally flat configuration, said knife blade comprising a cutting edge and a non-cutting edge opposite said cutting edge;

a brush for use in cleansing a crustacean, the brush being mounted directly on said non-cutting edge; and a handle including a base end to which said knife blade is attached, said handle further defining a distal free end opposite said base end, wherein said knife blade is controlled and manipulated by a user such that the user grasps said handle so as to position said cutting edge adjacent to the crustacean, further to expose the inedible portions of the crustacean using said cutting edge, further to position said non-cutting edge adjacent to the crustacean, and further to cleanse the crustacean by removing the inedible portions with said brush.

2. A method for manually cleaning a crustacean using a cutting implement, said cutting implement including an elongated knife blade further including a cutting edge and a non-cutting edge opposite said cutting edge, and said cutting implement further including a brush mounted on said non-cutting edge, the method comprising:

laterally rotating said cutting implement such that said cutting edge is adjacent to the crustacean;

exposing the intestinal cavity of the crustacean by cutting the crustacean using said cutting edge;

laterally rotating said cutting implement such that said brush is adjacent to the exposed intestinal cavity; and sweeping the intestinal cavity with said brush, such that the intestinal cavity of the crustacean is cleaned.

* * * * *